United States Patent [19]

Alessi et al.

[11] Patent Number: 4,958,220
[45] Date of Patent: Sep. 18, 1990

[54] COLOR IMAGING APPARATUS PRODUCING VISUALLY MATCHED DISPLAYS OF PERCEPTUALLY DISTINCT REPRODUCED IMAGES

[75] Inventors: Paula J. Alessi, Webster; William H. Faul, Pittsford; Edward J. Giorgianni, Rochester; Donald A. Koop, Macedon; Thomas E. Madden, Rochester, all of N.Y.

[73] Assignee: Eastman Kodak Company, Rochester, N.Y.

[21] Appl. No.: 290,676

[22] Filed: Dec. 27, 1988

[51] Int. Cl.⁵ .............................................. H04N 1/46
[52] U.S. Cl. ....................................... 358/76; 358/80
[58] Field of Search ................................... 358/76, 80

[56] References Cited

U.S. PATENT DOCUMENTS

| | | | |
|---|---|---|---|
| 4,278,995 | 7/1981 | Fearnside et al. | 358/54 |
| 4,500,919 | 2/1985 | Schreiber | 358/80 |
| 4,631,551 | 12/1986 | Vergona | 358/75 |
| 4,734,763 | 3/1988 | Urabe et al. | 358/80 |
| 4,797,712 | 1/1989 | Hayashi et al. | 358/76 |
| 4,812,879 | 3/1989 | Suzuki | 358/76 |

*Primary Examiner*—James J. Groody
*Assistant Examiner*—Mark R. Powell
*Attorney, Agent, or Firm*—Dennis P. Monteith

[57] ABSTRACT

Color image reproduction apparatus includes a video monitor for displaying a reproduced image (a soft copy) to appear on any of a variety of image-receptive output media (reversal film or negative film to print material or reversal film to print material) in which color of the reproduced image may vary from one type of output medium to another. A computer-based workstation, having a series of look-up tables for transforming imaging data to a variety of monitor-dependent RGB color spaces, enables the video monitor to show a series of displays of the reproduced image with each version of the reproduced image being visually matched to the reproduced image as it would appear on a particular one of the image-receptive output media.

6 Claims, 4 Drawing Sheets

COLOR IMAGING APPARATUS PRODUCING VISUALLY MATCHED DISPLAYS OF PERCEPTUALLY DISTINCT REPRODUCED IMAGES

BACKGROUND OF THE INVENTION

1. Field Of The Invention

The present invention relates generally to color image reproduction apparatus. More particularly, the invention relates to reproduction apparatus that visually matches a reproduced image on a video display with the reproduced image to appear on any of a plurality of image-receptive media.

2. Description Of The Related Art

Color image reproduction systems known in the art permit an operator to edit the color and composition of an original image to form a reproduced image. For example, U.S. Pat. No. 4,500,919 discloses an image reproduction system of one type in which an electronic reader scans a positive color image, which may be in the form of a transparency or a print, and converts it to an electronic image. A computer workstation and an interactive operator interface, including a video monitor, permits an operator to edit the image by means of displaying it on the monitor. When the operator has composed a desired image on the monitor, the workstation causes an output writer device to make an inked output of the reproduced image.

A color imaging apparatus is most valuable if the reproduced image shown on a video display, i.e. the soft copy proof, visually matches the hard copy produced by the output writer. Soft copy proofing provides capability to preview color manipulations, photocomposition and retouching operations.

The problem of producing a soft copy proof which visually matches a hard copy of a reproduced image is demonstrated when an image-bearing signal is sent to a video display and an output writing device. The reproduced images will not visually match each other since the phosphor spectral characteristics and other image reproduction properties of the video display differ from the image colorant characteristics and other image reproduction properties of the output writing device and image-receptive material. Furthermore, the intended viewing environments for the reproduced images may greatly differ, depending on the hard copy medium chosen.

The problem of visually matching a soft copy and a hard copy is amplified when a color image reproduction system is capable of forming a hard copy of a reproduced image on a variety of image-receptive output media of different types. This is because each type of hard copy output medium has unique color reproduction properties.

SUMMARY OF THE INVENTION

In view of the foregoing, an object of the invention is to enable an operator of color image reproduction apparatus to view a reproduced color image as it would appear on any of a variety of image-receptive output media. This object is achieved by computer-controlled means for showing on a video monitor a series of displays of a reproduced image with each reproduced image shown being visually matched to the reproduced image as it would appear on a particular one of the image-receptive output media.

In a presently preferred embodiment of a color image reproduction system, an output film writer functions to expose either a negative film or a reversal film to a reproduced image. A computer-based workstation, in response to an operator-controlled keyboard, edits an original image by manipulating imaging data in a device-independent perceptually based color space. Preferably, the color space, referred to hereinafter as the "database color space", should be perceptually uniform and should describe the appearance of an image in a specified viewing environment. For example, the database must account for the relative luminance level of the image surround, chromatic adaptive state of the observer, viewing flare, etc.

The workstation also serves to transform imaging data in database color space terms to red - green - blue (RGB) terms in color spaces related, respectively, to the video monitor and to the output film writer. For example, the values of the imaging data in RGB terms for the writer are functionally dependent on the type of output film (negative or reversal) to be exposed.

To achieve the object of the invention, the values for the imaging data in the RGB color space for exciting the phosphors of the video monitor are functionally related to the color or look of the reproduced image as it would appear in hard copy form. If a reversal output film is to be exposed, the RGB terms for imaging data for driving the phosphors of the video monitor are functionally related to the color of the reproduced image as it would appear directly on the reversal film. If a negative output film is to be exposed, on the other hand, the RGB terms for the phosphors of the video monitor are functionally related to the color of the reproduced image as it would appear on the type of material the negative film is eventually to be printed upon. By using the keyboard to select various combinations of output film, and print material if the output film is of the negative type, the operator causes the workstation to selectively show a series of displays of the reproduced image on the video monitor. Each reproduced image shown (a soft copy proof) is visually matched to the reproduced image as it would appear in a particular hard copy form, either directly on a reversal film or indirectly on a print material if the film writer exposes a negative film.

An operator can evaluate each soft copy proof of the reproduced image and pick the preferred one before an output film, negative or reversal, is actually exposed. An operator can also modify and aesthetically enhance an image.

These advantages, as well as other advantages of the invention, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
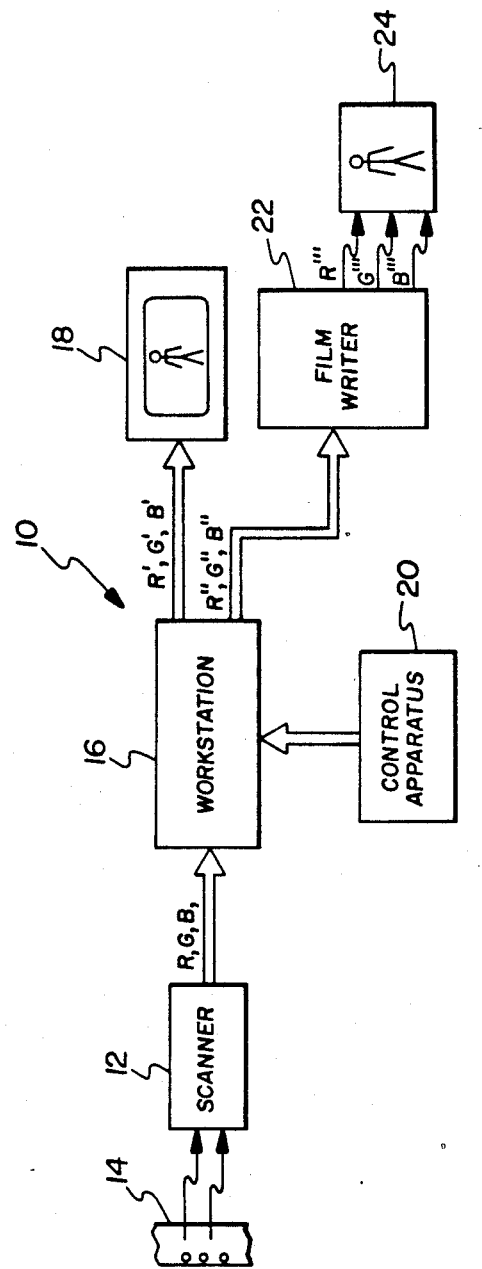
FIG. 1 is a block diagram of color image reproduction apparatus.

FIG. 1 shows, in block diagram form, color imaging apparatus 10 that permits an operator to edit electronically the color and composition of an original photographic image to produce an aesthetically modified image, referred to hereinafter as a "reproduced image". To that end, an image scanner 12 serves for scanning an original image on a photographic input film 14 and for producing red (R), green (G) and blue (B) image-bearing signals in digital form. A computer-based workstation 16, which receives the image-bearing signals from the scanner 12, enables the operator to modify (color and/or composition) the original image to construct the reproduced image. For that purpose, a video monitor 18 serves to display an image corresponding to an R'G'B' image-bearing signal provided by the workstation 16. Control apparatus 20, including a keyboard and a cursor, enables the operator to provide image manipulation commands pertinent to modifying the video image displayed. A film writer 22, in response to the workstation 16 supplying an R"G"B" signal corresponding to a final reproduced image displayed, then writes that image on an output film 24.

In a presently preferred embodiment, color imaging apparatus 10 provides an electronic retouching and photocomposition capability to users including commercial photographic laboratories and retouchers. To meet user needs, the scanner 12 is capable of digitizing an image from a negative film, such as KODAK VERICOLOR III Film manufactured by Eastman Kodak Company, or a reversal film, such as KODAK EKTACHROME Film or KODACHROME Film. Further towards meeting user needs, the scanner 12 receives negative or reversal film of various size ranging from 135 format to a sheet of approximately 20 centimeters (cm) by 25 cm.

The writer 22, on the other hand, is capable of producing a hard copy of the reproduced image by exposing a 20 cm by 25 cm size sheet of output film, either negative or reversal. Preferably, the aforementioned KODAK VERICOLOR III Film serves as a suitable negative film and KODAK EKTACHROME 100 Film as a reversal film. If a negative film is exposed, a hard copy of the reproduced image is formed by optically printing the negative onto a print material. KODAK EKTACOLOR PLUS Paper, KODAK EXTACOLOR Professional Paper, and KODAK DURATRANS Display Material are preferred print materials.

It will be appreciated by those skilled in the photographic art that perceptible color-content of a hard copy of a reproduced image varies from one type of output medium to another. Moreover, for a particular type of print material, the color of a reproduced image varies depending upon the type of negative film the image is printed from. In accordance with the invention, the video monitor 18 serves to display a reproduced image that is visually matched—a soft copy proof—to the reproduced image to appear on the particular output medium (reversal-type film or combination of negative-type film/print material) selected for the hard copy image.

Figure 2A:
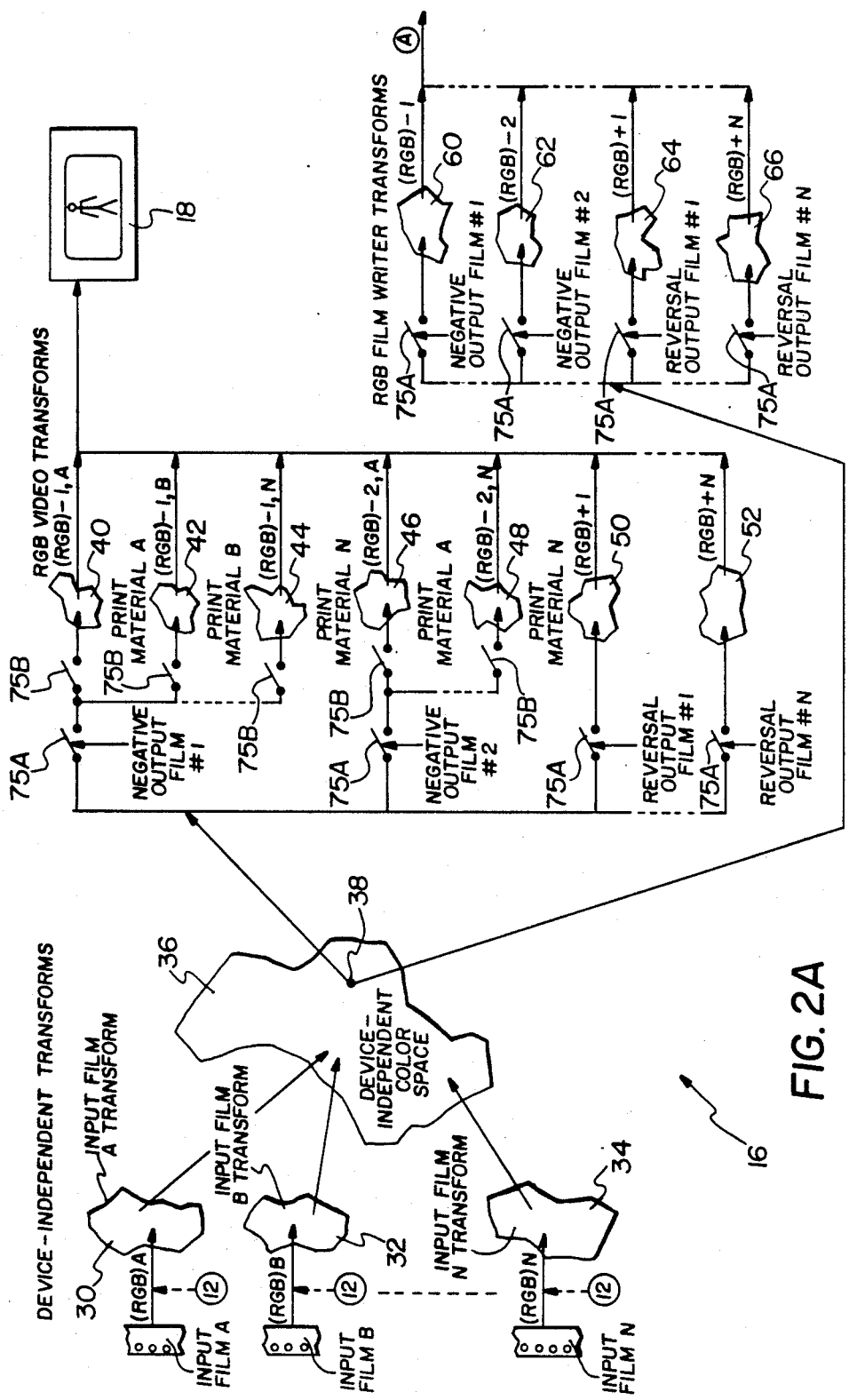
FIG. 2 (FIGS. 2A and 2B) is a diagrammatic illustration, in accordance with the teachings oF the invention, oF the manner in which a reproduced image shown on a video monitor oF the color image reproduction apparatus is visually matched with the reproduced image to appear on a given output medium.
Figure 2B:
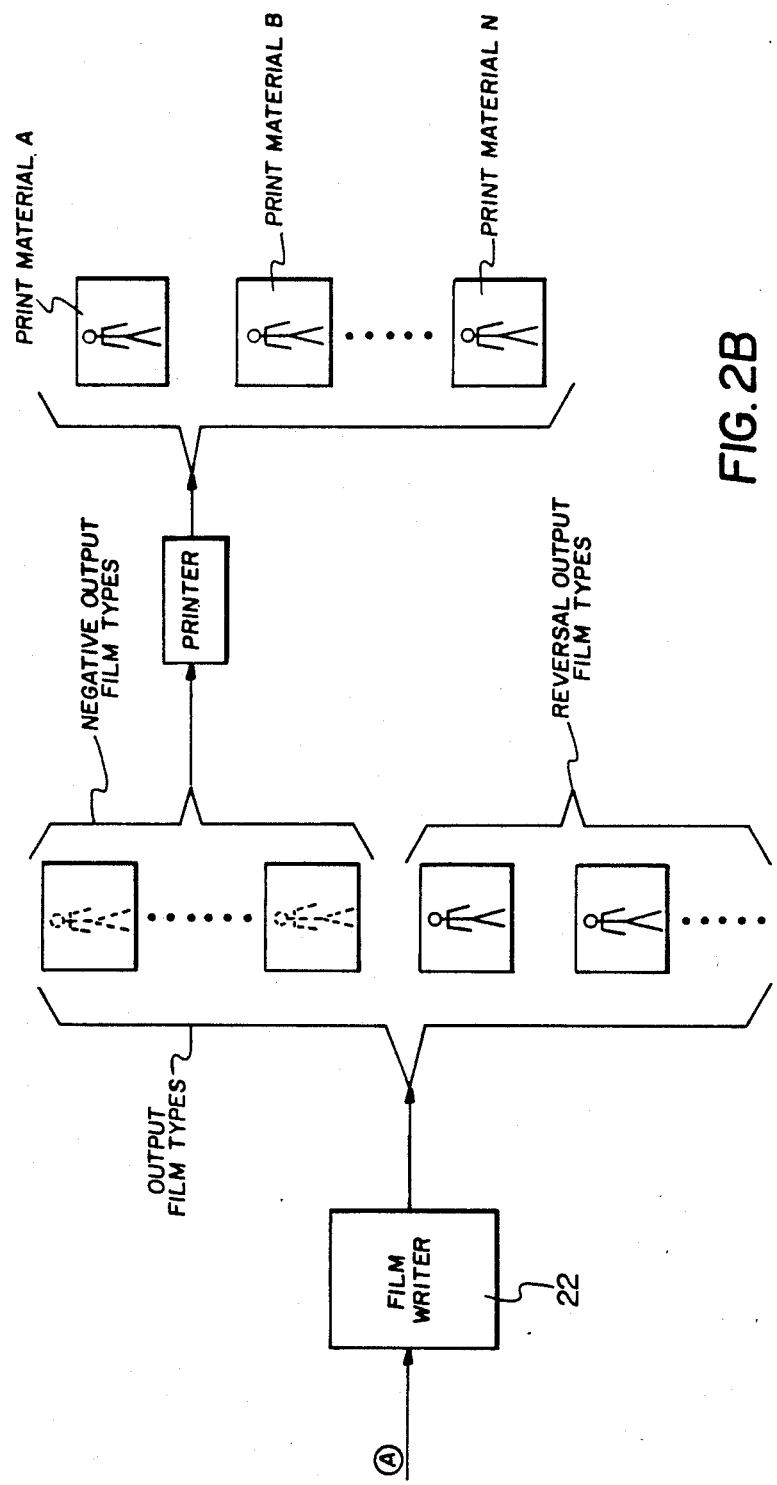

FIG. 2 illustrates diagrammatically the manner in which a reproduced image shown on the video monitor 18 (soft copy) is visually matched with the reproduced image to appear on the output medium (hard copy) selected. First, the scanner 12 converts a color image on a given input film (reversal or negative) into red (R), green (G) and blue (B) image-bearing signals.

The workstation 16 then transforms each image-bearing signal from RGB color space to the database color space.

Transformations of RGB imaging data to a common color representation let images from a variety of different types of input films be used interchangeably for reproduction purposes, regardless of source. For that purpose, an image on a negative film is encoded into database color space terms that a reversal film, for example Kodak Ektachrome film, would have produced for the same scene. The greater exposure latitude of the negative film is handled by appropriately adjusting the scanner-measured densities such that an optimum image results.

Region 30 represents the transformation to the database color space from RGB imaging data corresponding to an image on a film A, for example a reversal film; a different region, denoted 32, illustrates the transform into database color space terms from RGB imaging data corresponding to an image on a film B, for example a negative film.

The transform from RGB space to database color space is different for each type of input film scanned. Region 34 represents the transform to database color space terms from RGB terms for an image on an input film N (reversal or negative) of a type different from any of the other input films (reversal or negative).

The functional relationship between an RGB color space for a given film and the database color space, represented by one of the regions 30, 32, 34, etc., is determined by using laboratory test data. For example, a scanner functions for reading R, G, and B density values from color test strips for a particular film; spectrophotometric methods, known in the photographic art, serve to provide data needed to calculate the transformations into database color space.

The workstation 16 has an internal memory capable of storing multiple original images and a "work-in process" image. A work-in-process image can consist of, for example, an original image modified to some degree or the blending of two or more images (original or modified) to form a composite image. Region 36 of FIG. 2 represents the manipulation within workstation 16 of one or more original images in database color space terms to derive a final reproduced image, denoted 38.

To assist in the editing of an image, video monitor 18 serves to display a work-in-process image as it is being modified within the workstation 16 under the influence of operator-generated commands from the control apparatus 20. To produce a video display of a work-in-process image, the workstation 16 further serves to transform a signal, corresponding to the image to be displayed, to RGB terms from database color space terms, in accordance with the phosphor spectral characteristics and other image reproduction properties of the video monitor 18.

When a negative output film is to be exposed, the image displayed on the video monitor 18 is visually matched to the image as it would appear on the type of print material to be exposed from the negative. For that purpose, the database color space values are transformed into corresponding values appropriate for the selected combination of output film and print material. Thus, a soft copy proof is appropriate for a given negative film printed onto any one of a variety of suggested print materials.

Regions 40, 42 and 44 of FIG. 2, which are different from each other, illustrate that, for a given negative output film, the transform to RGB video terms from the database color space is functionally dependent upon the type of print material selected for exposure from the negative. Similarly, the regions 46 and 48, which are also different from each other and from the transform regions 40, 42 and 44, illustrate that the transforming of imaging data to RGB video terms from the database color space is also functionally dependent upon the type of negative output film to be exposed.

When a reversal output film is to be exposed, the image displayed on the video monitor 18 is visually matched to the image as it would appear directly on the reversal film selected. To that end, nevertheless, transform regions 50 and 52 illustrate that the transforming to RGB video space from the database color space is also functionally dependent on the reversal output film selected.

Film writer 22 serves to expose either a reversal film or a negative film to a reproduced image. FIG. 2 illustrates that a negative film exposed is intended to be printed subsequently onto any of a variety print materials. As described previously herein, Kodak Ektacolor Plus paper, Kodak Ektacolor professional paper, or Kodak Duratrans display material are selected for printing a hard copy from any of the different types of output negative film that might be exposed.

The regions 60, 62, 64, and 66 represent, respectively, the transforming of an image-bearing signal, corresponding to the reproduced image displayed, to RGB signals from the database color space in accordance with the properties of the film writer 22 and the color reproduction properties of the output materials. Preferably, film writer 22 is of the type described in U.S. Pat. No. 4,631,551, assigned to the assignee of the present invention, in which each electro-optical modulator includes a lanthanum-doped lead zirconate titanate (PLZT) material which changes the intensity of image-bearing light in response to an applied electric signal. Again, however, each transformation is different, as represented by the different regions 60 through 66, to account for differences in the output film (reversal or negative) selected for exposure.

The functional relationship between database color space terms and corresponding RGB terms for a given output film, represented by one of the regions 60 through 66, is determined by laboratory test data. To that end, the film writer 22 first generates calibration data in the form of standard color test strips on each output film (or combination negative film/print material). For each standard color, the set of RGB input drive signals are recorded which, in turn, have a corresponding unique set of database color space values.

Figure 3:
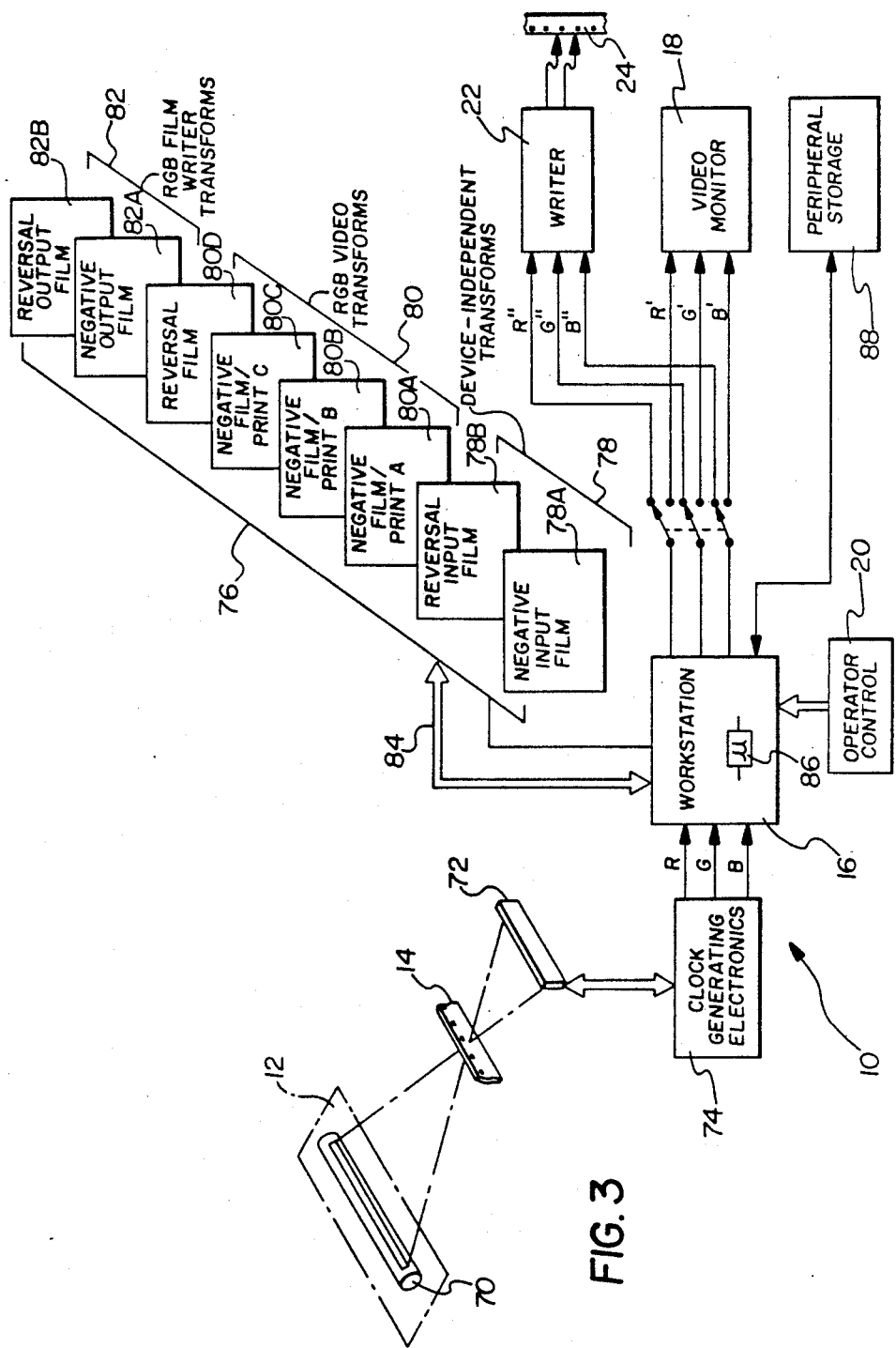
FIG. 3 shows in further detail a preferred embodiment of color image reproduction apparatus.

FIG. 3 shows, in further detail, color imaging apparatus 10 that permits an operator to edit the color and composition of an original photographic image and to produce a hard copy of a reproduced image on any of a variety of different types of output media selected. For that purpose, the imaging apparatus 10, in accordance with the teachings of the present invention, visually matches a display of the reproduced image on the video monitor 18 as it would appear on the type of output medium selected. To that end, the imaging apparatus 10 employs a variety of digitally operated look-up tables (LUTs), each of which is functionally related to a particular output medium selected, for transforming an image (an original, work-in-process, or the final reproduction) from database color space terms into appropriate R'G'B' video drive signals such that the color image displayed (soft copy proof) visually matches the resulting hard copy.

The image scanner 12, which has a light source 70 defining preferably a line of diffuse illumination, serves for scanning an image on the photographic input film 14 (reversal or negative). For that purpose, the film 14 is mounted on a movable drum, table or the like (not shown) for stepwise movement in a line scan direction, preferably under the influence of a stepper motor (also not shown).

A charge coupled device (CCD) linear image sensor 72, arranged to receive a line of light modulated in accordance with the film image, includes an overlay comprising three parallel arrays of color filters—red (R), green (G), and blue (B). This "tri-linear" image sensor 72 further includes three corresponding parallel output registers which are coupled, respectively, to an output of one of the color filter arrays. Thus, the respective outputs from the three registers correspond to R, G, and B image-bearing signals.

Clock generating electronics 74 serves to control the CCD sensor 72 and to process its output signals to produce, in a known manner, a high-resolution RGB image-bearing signal corresponding to the film image. The clock generating electronics applies R, G, and B signals in digital form to the microprocessor-based workstation 16 for subsequent operations, such as editing the image and to provide a composite video signal for displaying the reproduced image on the video monitor 18.

A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

The microprocessor-based workstation 16 enables an operator to modify (color, sharpness, and/or composition) the digital signal image. To that end, the video monitor 18, which includes a frame store and a digital to analog (D/A) converter, serves to display an image corresponding to R'G'B' signals provided by the workstation 16. Sun Microsystems Inc., Mountain View, California, manufactures an interactive workstation of this general type.

The operator control apparatus 20, preferably including a keyboard and a mouse or tablet, enables an operator to interact with the workstation 16 to provide input information such as input film type and film size, image-manipulation commands pertinent to modifying the image displayed, and output information such as output film type/print material type. The keyboard signals the output film type by means of closing the appropriate switch 75(A) (FIG. 2A); when a negative film is to be exposed, the keyboard signals the print material selected by causing the appropriate one of the switches 75(B) (also FIG. 2A) to close.

The image-manipulation commands enable an operator to edit a single image or combine two or more images into a single composite image. To that end, the control apparatus 20 includes a series of image-manipulation functions that allow an operator to modify an image (single or composite) in a manner preferred for printing a given negative film onto a particular print material. The following operator-controlled functions are exemplary:

CROP—eliminates unwanted portions of image edges;

REPLICATE—"stretch" an image by repetition of selected portions;

SIZE CHANGE—magnifies image size by a specified factor;

MASK—defines "regions of interest" by boundary specifications;

CUT—extract a selected image portion;

PASTE—combine one image with another;

COLOR BALANCE—change overall image color;

CONTRAST—manipulate contrast curves; and

HUE/CHROMA/LIGHTNESS—independent control of color quantities.

The workstation 16 also has available to it color imaging data in R"G"B" space for driving the film writer 22.

For accomplishing its functions, the workstation 16 has associated with it a bank of storage devices 76 that individually serve as a digitally operated LUT for transforming image data in one color space to data representing the same image in a different color space. A first set of storage devices 78 functions to transform RGB data, corresponding to an original image read from an input film, to database color space data. LUT 78A for example, serves to transform RGB data, corresponding to an original image on a negative film, to the database color space image data; a second LUT 78B transforms RGB data, corresponding to an image from a reversal film, to database color space.

A second set of storage devices 80 functions to transform imaging data to appropriate RGB video terms from database color space terms for the purpose of visually matching the soft copy proof—the video image displayed—with a hard copy to appear, in accordance with the teachings of the invention. When negative output film is to be exposed, LUTs 80A, 80B, 80C serve, respectively, to transform imaging data to RGB terms appropriate for displaying a video image visually matched to the image occurring when the negative film is printed onto a material of type A, a material of type B, or a print material of type C.

When a reversal output film is to be exposed, LUT 80D functions to transform database color space imaging data to RGB terms appropriate for matching the video display with the image to appear directly on the reversal film.

A third set of storage devices 82 serves to transform database color space data to appropriate RGB data for exposing an output film. LUT 82A, for example, serves to transform data to RGB data for exposing a negative film, preferably KODAK VERICOLOR III Film; LUT 82B transforms database color space imaging data to RGB data for exposing a reversal film, preferably KODAK EKTACHROME Film.

To convert image data into a desired color space, the workstation 16, by means of a LUT select line 84, retrieves "transform" data from the appropriate LUT. One or more processing devices, denoted by a microprocessor 86, perform, under program control, both logic operations to retrieve data values from the correct addresses of the LUT selected and arithmetic operations for linear interpolation on the values retrieved.

When a desired image has been composed on the video monitor 18, an operator may make a machine-readable record of the image displayed. To that end, a peripheral storage device 88, such as a magnetic tape or magnetic disk, functions to record image-bearing signals, preferably in database color space terms, corresponding to the final image composed.

The invention has been described in detail with reference to the figures; however, it will be appreciated that variations and modifications are possible within the spirit and scope of the invention. For example, the workstation 16 may conveniently display successive versions of the reproduced image sequentially on the video monitor in accordance with each output medium selected by an operator; on the other hand, the workstation can be programmed to display multiple soft copy proofs of the reproduced image simultaneously to allow an operator to more readily compare the color of one version to other versions. It will also be understood by those skilled in the art that the aforementioned LUT operations can be accomplished with a series of equivalent mathematical transformations.

What is claimed is:

1. In color image reproduction apparatus including a video monitor for displaying a reproduced image to appear on any of a variety of image-receptive output media in which perceptible color of the reproduced image varies from one type of output medium to the next, wherein the improvement comprises:

control means coupled to said video monitor and arranged for manipulating a first set of signals corresponding to an original input image, to produce a second set of signals corresponding to a reproduced image relating to a modification of the original image, said control means further being arranged for showing on said video monitor a series of displays of the reproduced image with each reproduced image shown being visually matched to the reproduced image as it would appear on a particular one of the image-receptive output media.

2. In color image reproduction apparatus including a video monitor for displaying a reproduced image to appear on any of a variety of image-receptive output media in which the look of the reproduced image varies from one type of output medium to the next, wherein the improvement comprises:

programmable computer-based control means, coupled to said video monitor, programmed for manipulating a first set of signals corresponding to an original input image, to produce a second set of signals corresponding to a reproduced image relating to a modification of the original image, said computer-based control means being further programmed for showing on said video monitor a series of displays of the reproduced image with each reproduced image shown being visually matched to the reproduced image as it would appear on a particular one of the image-receptive output media.

3. Color reproduction apparatus as defined in claim 2 wherein one type of output medium is a photographic film of the reversal type.

4. Color image reproduction apparatus as defined in claim 2 wherein a hard copy of the reproduced image is formed by optically printing a photographic film of the negative type onto a print material.

5. Color image reproduction apparatus as defined in claim 2 wherein said control means is programmed for displaying multiple versions of the reproduced image simultaneously on said video monitor.

6. Color image reproduction apparatus as defined in claim 2 wherein said control means includes means for displaying the reproduced image sequentially on said video monitor in accordance with the type of output medium selected.

* * * * *